United States Patent [19]
Balthazard et al.

[11] Patent Number: 5,896,754
[45] Date of Patent: Apr. 27, 1999

[54] CONDENSER WITH BUILT-IN RESERVOIR FOR MOTOR VEHICLE AIR CONDITIONING SYSTEM

[75] Inventors: Patrick Balthazard, Guignicourt; Philippe Faille, Reims, both of France

[73] Assignee: Valeo Thermique Moteur, La Verriere, France

[21] Appl. No.: 08/793,244

[22] PCT Filed: Jun. 19, 1996

[86] PCT No.: PCT/FR96/00948

§ 371 Date: Feb. 21, 1997

§ 102(e) Date: Feb. 21, 1997

[87] PCT Pub. No.: WO97/01067

PCT Pub. Date: Jan. 9, 1997

[30] Foreign Application Priority Data

Jun. 23, 1995 [FR] France .................................. 95 07599

[51] Int. Cl.[6] .................................................. F25B 39/04
[52] U.S. Cl. .............................. 62/507; 62/509; 165/132; 165/173
[58] Field of Search ...................... 62/507, 509; 165/132, 165/173, 174

[56] References Cited

U.S. PATENT DOCUMENTS

| 2,028,458 | 1/1936 | Karmazin . | |
|---|---|---|---|
| 2,105,121 | 1/1938 | Karmazin . | |
| 4,972,683 | 11/1990 | Beatenbough | 62/507 |
| 5,088,294 | 2/1992 | Ando . | |
| 5,172,758 | 12/1992 | Aoki . | |
| 5,186,248 | 2/1993 | Halstead . | |
| 5,228,315 | 7/1993 | Nagasaka et al. . | |
| 5,505,253 | 4/1996 | Heraud | 62/509 |
| 5,546,761 | 8/1996 | Matsuo et al. | 62/509 |
| 5,628,206 | 5/1997 | Baba | 62/507 |

FOREIGN PATENT DOCUMENTS

| 0 480 330 | 4/1992 | European Pat. Off. . |
| 2 491 610 | 4/1982 | France . |
| 2 521 277 | 8/1983 | France . |

*Primary Examiner*—William E. Tapolcai
*Attorney, Agent, or Firm*—Morgan & Finnegan, L.L.P.

[57] ABSTRACT

A condenser for a cooling circuit conveying a refrigerant, including a bundle of tubes mounted between a first collecting box and a second collecting box, an inlet for the gaseous refrigerant, an outlet for the condensed refrigerant, and a reservoir through which the refrigerant may flow. The reservoir is housed in the collecting box and communicates via at least one aperture with a downstream portion of the bundle on the outlet side of the condenser. The condenser is useful for motor vehicle air conditioning.

29 Claims, 6 Drawing Sheets

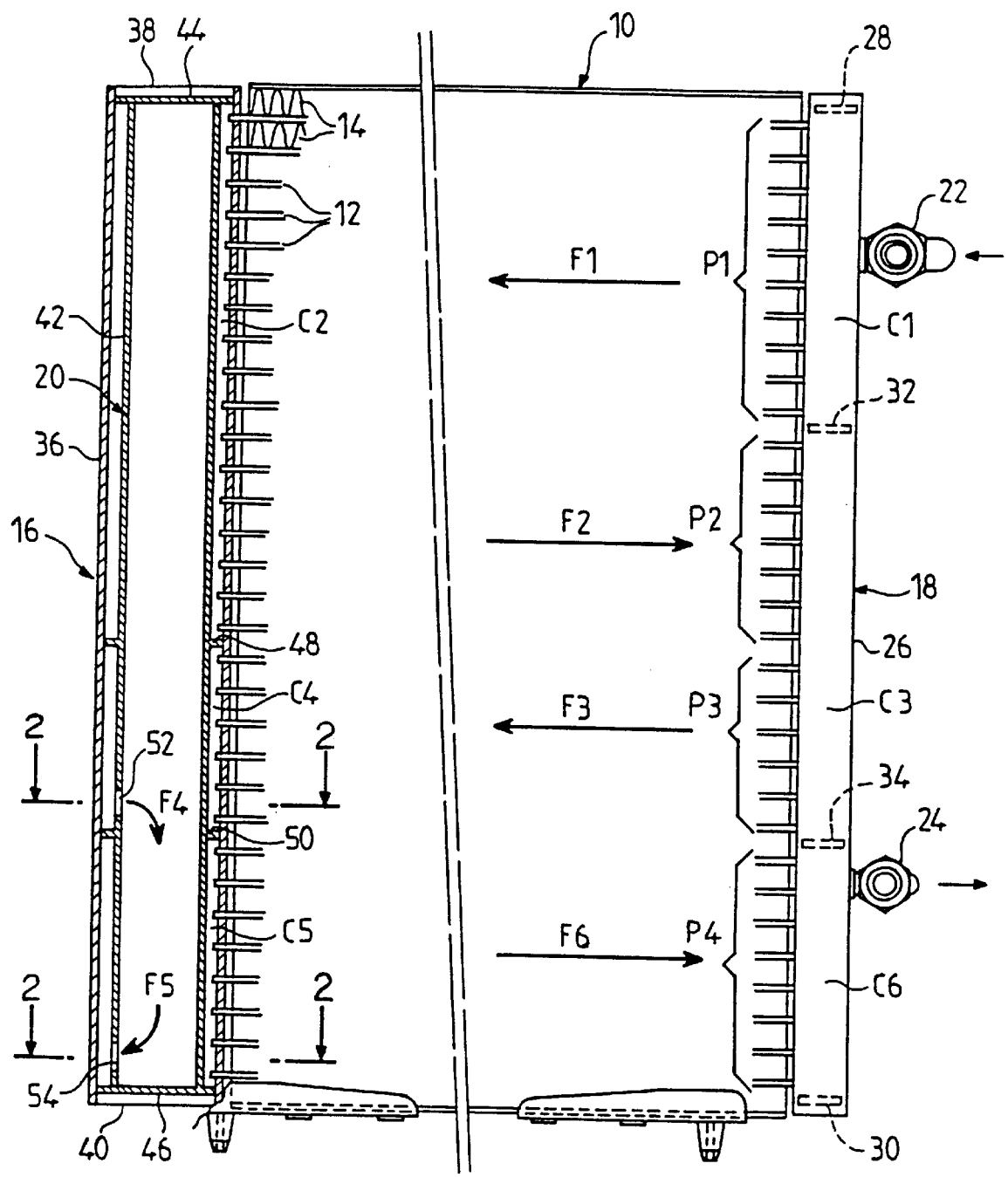
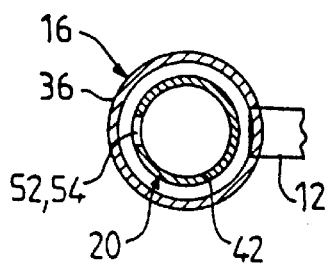
FIG. 1
FIG. 2

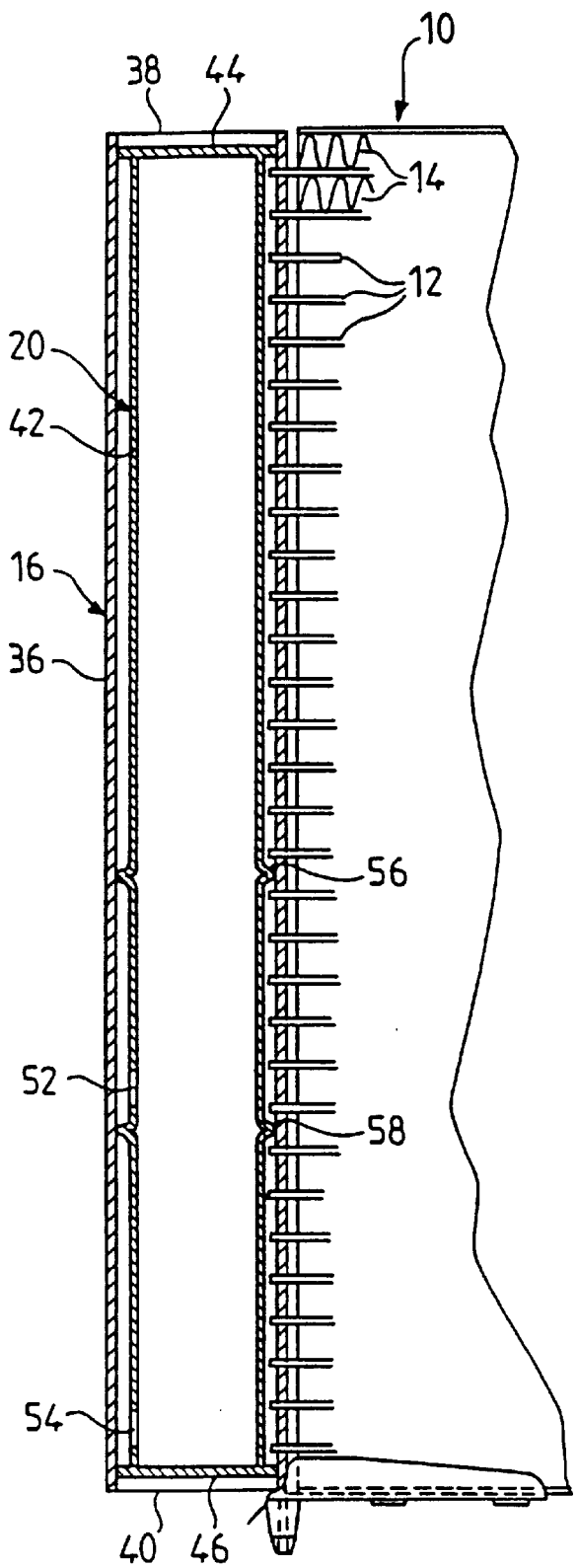
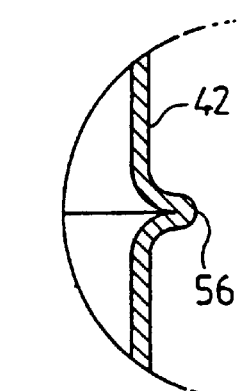
FIG. 6
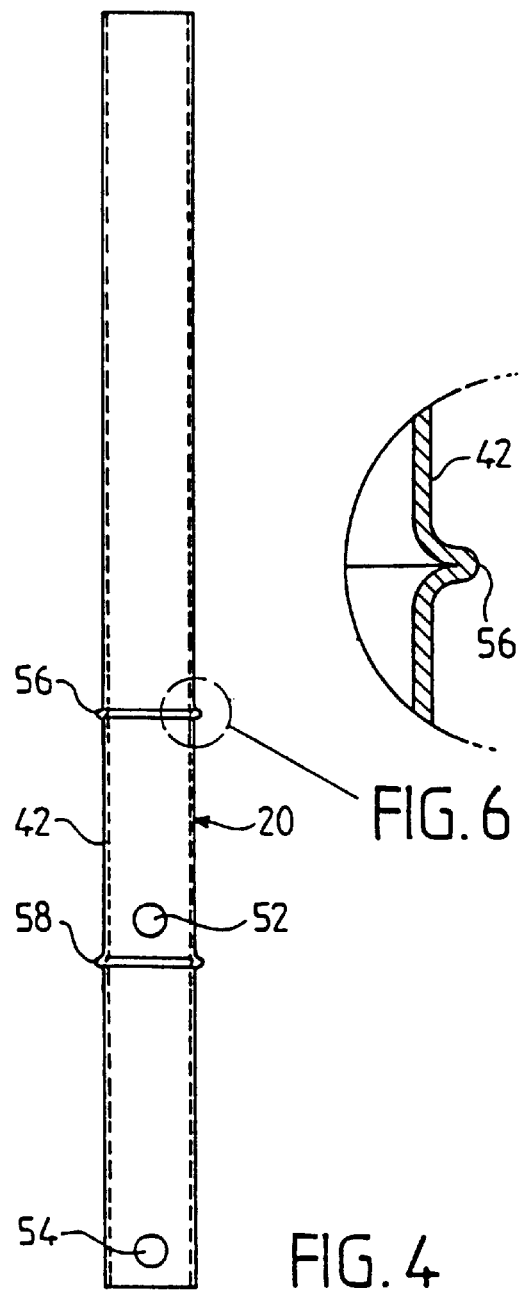
FIG. 4
FIG. 3
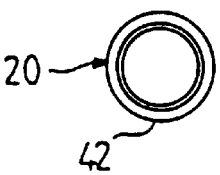
FIG. 5

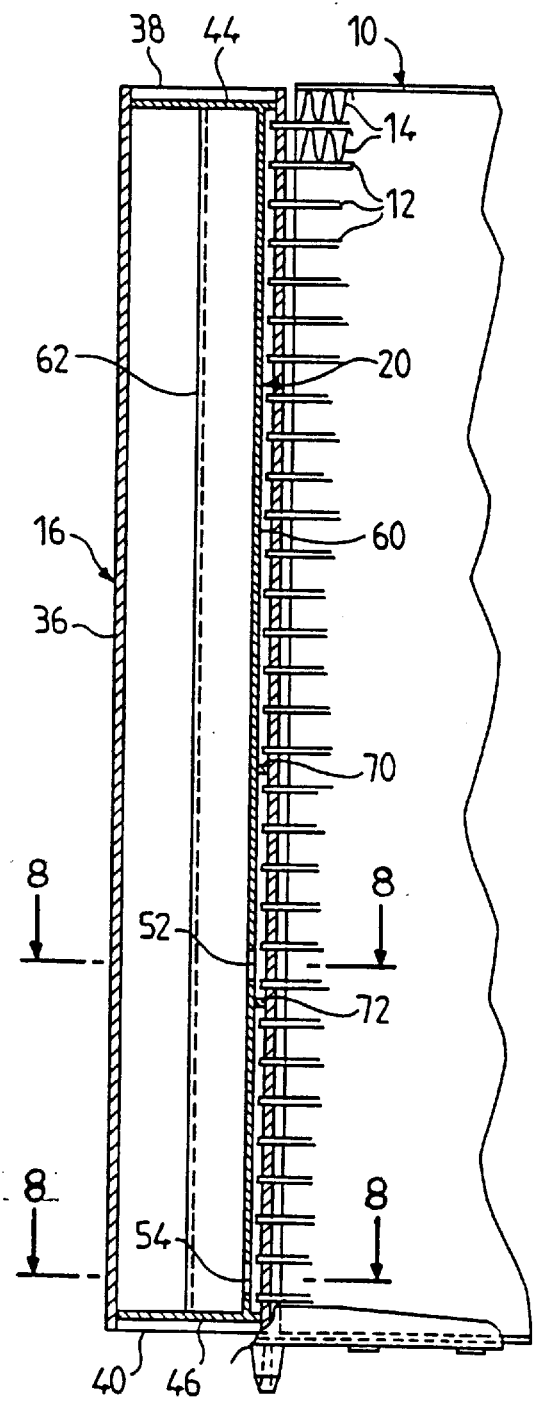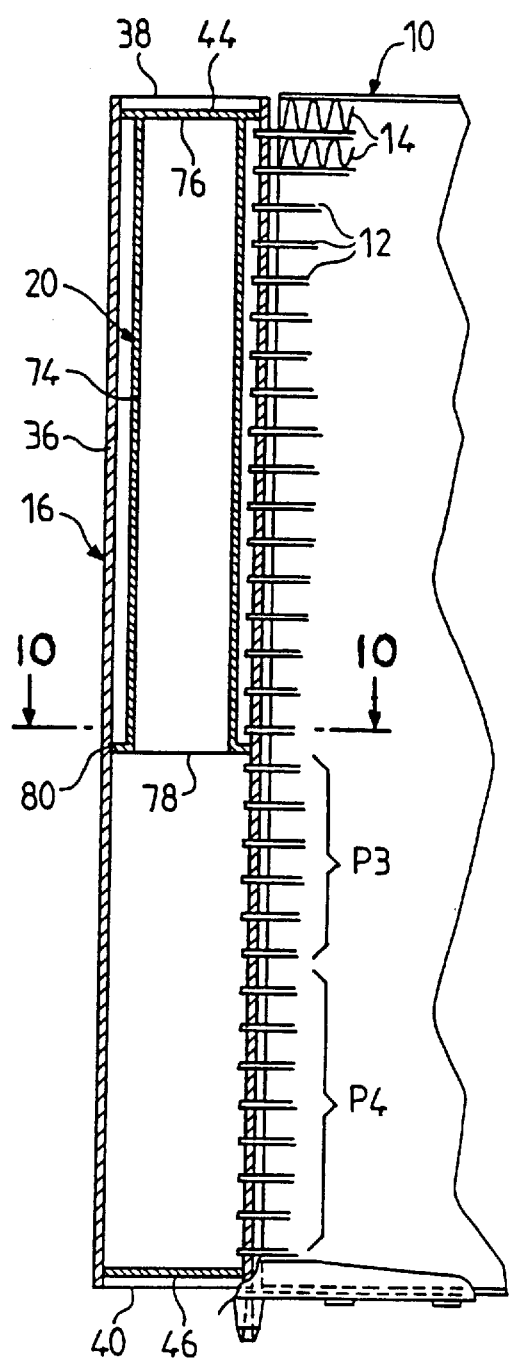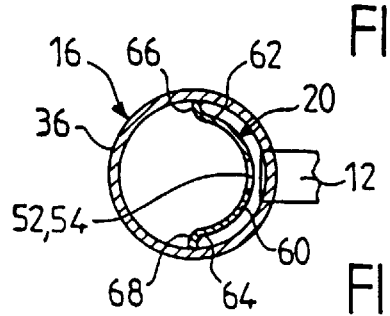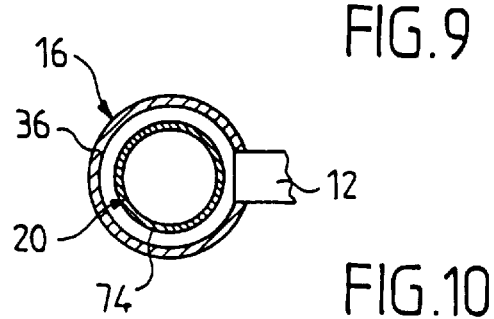

CONDENSER WITH BUILT-IN RESERVOIR FOR MOTOR VEHICLE AIR CONDITIONING SYSTEM

The invention relates to a condenser which can form part of a refrigeration circuit, for example part of an air conditioning system for a motor vehicle.

It relates more specifically to a condenser for a refrigeration circuit through which a refrigerant travels, comprising a bundle of tubes which is mounted between two manifolds, an inlet for the gaseous refrigerant, an outlet for the condensed refrigerant, as well as a reservoir through which the refrigerant can pass.

In a refrigeration circuit of this type, the refrigerant is sent, in superheated vapor phase, under the action of a compressor, toward the condenser where it is in turn cooled or "unsuperheated", condensed into a hot liquid phase, then "supercooled" into a cold liquid phase.

The condensed and cooled refrigerant is then sent, via a pressure reducer, toward an evaporator where it exchanges heat with an airflow to be sent into the cabin of the vehicle. In the evaporator, the refrigerant is converted into the vapor phase, while the airflow is cooled to provide air-conditioned air. The refrigerant in the vapor phase leaves the evaporator to return thereafter to the compressor and carry out another operating cycle.

In condensers of this type, the reservoir is usually produced in the form of a separate receptacle also known as a "bottle" which is placed in the circuit between the condenser and the pressure reducer.

Also known, from French Patent Application No. 93 10325, is a condenser of this type in which the reservoir is built into the condenser by being fixed on the outside of one of the manifolds.

This known solution requires the provision of connections and holding lugs between the reservoir and the manifold, which makes the assembly of the condenser, especially the brazing operations, complicated.

Furthermore, this known solution increases the bulk of the condenser owing to the fact that the reservoir is arranged outside one of the manifolds.

What is more, the external reservoir constitutes an element which is mounted in cantilever fashion and generates vibration at the condenser.

The object of the invention is especially to overcome the aforementioned drawbacks.

It therefore proposes a condenser of the type defined in the introduction, in which the reservoir is produced in the form of a receptacle housed in a first manifold and communicating, via at least one opening, with a downstream part of the bundle on the outlet side of the condenser.

It is thus no longer necessary to provide connections and holding lugs between the reservoir and the manifold, owing to the fact that the reservoir is housed inside the manifold.

It is thus possible to produce the reservoir and manifold as a single piece, something which requires assembly operations which are less complicated and less time-consuming.

This appreciably simplifies brazing operations.

The condenser of the invention also has the advantage of offering reduced bulk, owing to the fact that the external reservoir is eliminated.

Furthermore, it better withstands vibration on account of the fact that it eliminates any element mounted in cantilever fashion outside the manifold.

In a first embodiment of the invention, the manifold comprises a tubular side wall, while the reservoir comprises a side wall which is at least partially spaced away from the side wall of the manifold, transverse partitions being provided between the side wall of the manifold and the side wall of the reservoir so as to define peripheral compartments communicating with different parts of the tube bundle so as to allow multipass circulation of the refrigerant through the tube bundle.

Advantageously, the side wall of the reservoir comprises an opening for the inlet of refrigerant coming from a peripheral compartment and an outlet for removing condensed refrigerant toward a second peripheral compartment, which communicates with the outlet of the condenser through a part of the bundle.

Thus the condensed refrigerant passes through the reservoir and then leaves the condenser after having passed through part of the bundle.

As an alternative, the reservoir comprises an end opening which makes the inside of the reservoir communicate with a compartment which is provided in the first manifold and which communicates with the outlet of the condenser, this outlet being provided on the first manifold.

In this first embodiment of the invention, the side wall of the reservoir is preferably tubular and coaxial with the tubular side wall of the manifold, while the transverse partitions are annular, and the peripheral compartments also have an annular-shaped cross section.

In an alternative embodiment, the side wall of the reservoir is curved and attached to two opposed generatrices of the side wall of the manifold, while the transverse partitions are in the shape of crescents and the peripheral compartments also have a crescent-shaped cross section.

In another embodiment of the invention, the manifold wall comprises a tubular side wall, while the reservoir comprises a tubular side wall which is coaxial with the side wall of the manifold, extends along part of the manifold and emerges in another part of the manifold via an open end, an annular partition being provided between the side wall of the manifold and the side wall of the reservoir at the open end thereof.

Thus the side wall of the reservoir extends only over part of the height of the first manifold.

The second manifold normally has no reservoir and it is then advantageous for the inlet and for the outlet of the condenser to be provided on this second manifold.

In another embodiment of the invention, the second manifold also houses a second reservoir which communicates, via at least one opening, with a downstream part of the bundle on the outlet side of the condenser.

As a preference, the second manifold comprises a tubular side wall, while the second reservoir also comprises a side wall which is at least partially spaced away from the side wall of the manifold, transverse partitions being provided between the side wall of the second manifold and the side wall of the second reservoir so as to define peripheral compartments communicating with different parts of the bundle so as to allow multipass circulation of the refrigerant through the tube bundle.

As a preference, the side wall of the second reservoir is tubular and coaxial with the tubular side wall of the second manifold, the transverse partitions being annular and the peripheral compartments also being of annular-shaped cross section.

According to another feature of the invention, the side wall of the second reservoir includes an opening causing the inside of the reservoir to communicate with a peripheral compartment of the second manifold, in which compartment the outlet of the condenser emerges.

In another alternative form, the first reservoir and the second reservoir have respective open ends which emerge in two end compartments formed respectively in the first manifold and the second manifold, these two end compartments communicating with each other via some of the tubes of the bundle.

This alternative form has the advantage of separating the liquid and vapor phases even on the first pass of the refrigerant, in order to improve the condenser performance.

In the description which follows, which is given merely by way of example, reference is made to the appended drawings, in which:

FIG. 1 is a view in elevation and in part section of a condenser according to a first embodiment of the invention;

FIG. 2 is a view in section on one or other of two lines II—II of FIG. 1;

FIG. 3 is a partial view similar to that of FIG. 1 for an alternative form;

FIG. 4 is a view in elevation of the reservoir of the condenser of FIG. 3;

FIG. 5 is a view from above of the reservoir of FIG. 4;

FIG. 6 is a detail on a larger scale and in section of the reservoir of FIG. 4;

FIG. 7 is a partial view in section of a condenser according to a second embodiment of the invention;

FIG. 8 is a view in section on one or other of the two lines VIII—VIII of FIG. 7;

FIG. 9 is a partial view in section of a condenser according to a third embodiment of the invention;

FIG. 10 is a view in section on the line X—X of FIG. 9;

Figure 11:
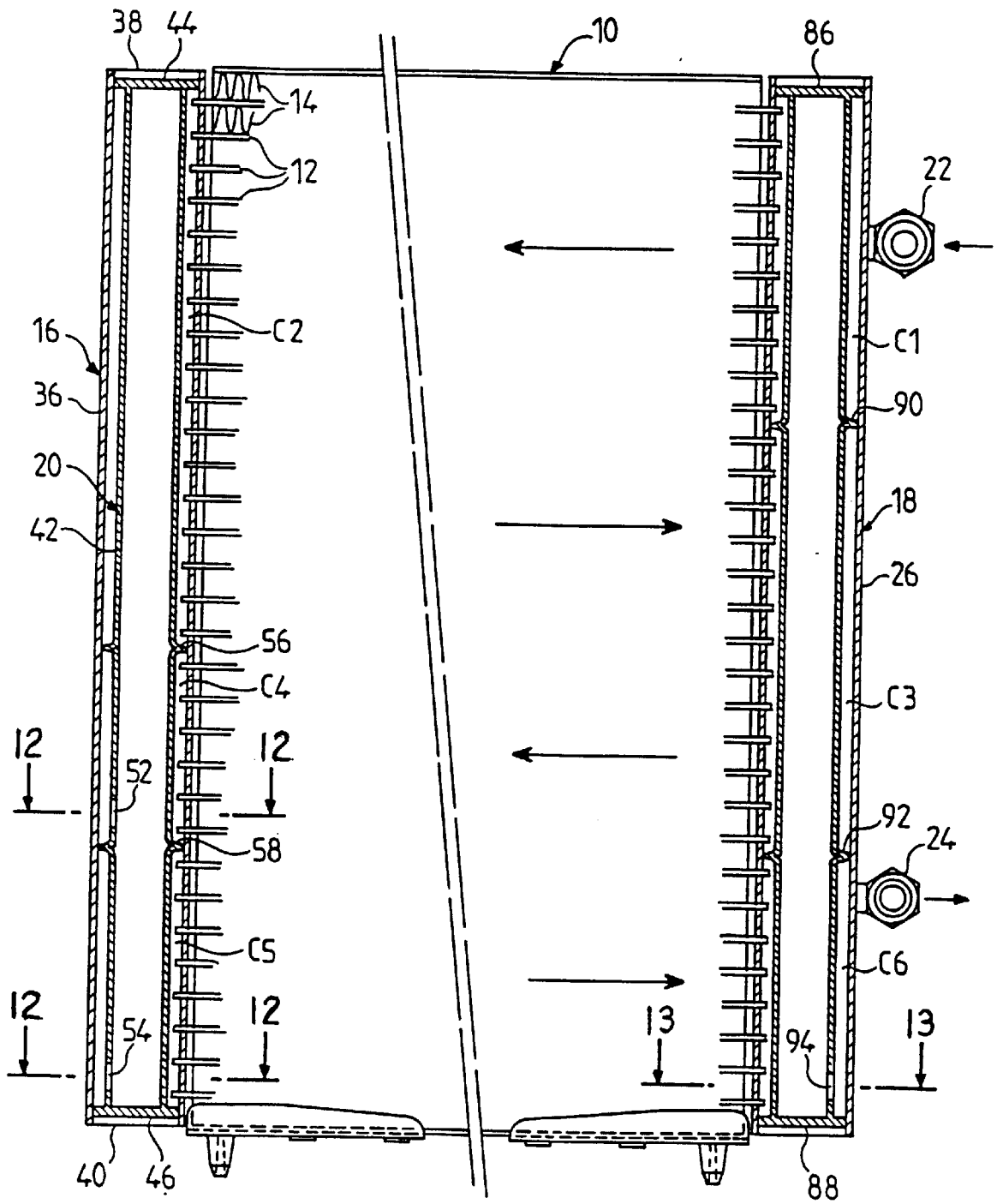
FIG. 11 is a view in elevation and part section of a condenser according to a fourth embodiment of the invention.

The condenser of FIG. 1 comprises a bundle 10 formed of a great many flat tubes 12 between which spacers 14 of wavy overall shape forming heat-exchange fins are placed.

The bundle 10 is mounted between a first manifold 16 and a second manifold 18 of tubular shape with circular section and parallel axes. The manifold 16 internally houses a reservoir 20, while the manifold 18 is fitted with an inlet 22 for letting in a refrigerant in the form of superheated vapor and with an outlet 24 for the removal of the refrigerant in the form of a cooled liquid phase. As it passes through the heat exchanger, the refrigerant is in turn cooled or "unsuperheated", condensed into a hot liquid phase, then "supercooled" into a cold liquid phase, and this takes place by heat exchange with an airflow sweeping across the bundle 10.

The manifold 18 is delimited by a tubular side wall 26 closed at its two ends by two end walls 28 and 30 and fitted with two internal partitions 32 and 34 arranged at chosen points. The tubes 12 of the bundle communicate with the manifold 18 via appropriate openings made in the side wall 26.

The first manifold 16 comprises a tubular side wall 36 of circular section, with a larger diameter than the side wall 26, and fitted with two open ends 38 and 40.

The reservoir 20 comprises a side wall 42 of tubular shape with circular section and housed inside the side wall 36. The wall 42 extends over practically the entire height of the first manifold (as defined between its ends 38 and 40) and this side wall 42 is closed by two end walls 44 and 46 which continue as far as inside the side wall 36 in order at the same time to close the ends 38 and 40 of the manifold 16.

Moreover, two annular transverse partitions 48 and 50 are provided between the walls 36 and 42 between chosen points so as to define annular compartments in which the tubes 12 of the bundle emerge, thanks to openings made in the wall 36.

The refrigerant can thus circulate through the condenser, between the inlet 22 and the outlet 24 in a circuit involving a number of passes, also known as a "multipass" circuit. The fluid first of all reaches a compartment C1 defined in the manifold 18 between the wall 28 and the partition 32. The refrigerant next (arrow F1) via part P1 of the bundle reaches an annular peripheral compartment C2 delimited between the walls 36 and 42 and between the wall 44 and the partition 48. Next, the fluid (arrow F2) via part P2 of the bundle reaches a compartment C3 delimited in the manifold 18 between the partitions 32 and 34. From there, the fluid (arrow F3) via part P4 of the bundle reaches a compartment C4 delimited between the walls 36 and 42 and between the partitions 48 and 50.

The fluid next enters the reservoir 20 (arrow F4) through an inlet opening 52 made in the side wall 42. The fluid then leaves the reservoir through an outlet opening 54 (arrow F5) to reach a compartment C5 delimited between the side walls 36 and 42 and between the end wall 46 and the annular partition 50. The fluid then (arrow F6) via part P4 of the bundle reaches a compartment C6 of the manifold 18, into which compartment the outlet 24 emerges.

When the fluid enters the reservoir 20 via the opening 52 it is in the liquid phase and it is then supercooled as it passes through the part P4 of the bundle which part lies toward the downstream end. The reservoir 20 makes it possible to absorb the variations in volume of the refrigerant as a function of expansion phenomena.

In the embodiment of FIG. 1, the transverse partitions 48 and 50 are formed by annular elements attached between the side wall 36 of the manifold 16 and the side wall 42 of the reservoir 20.

In the embodiment of FIGS. 3 to 6, to which reference is now made, the annular transverse partitions are obtained by localized deformation of the side wall 42 of the reservoir, so as to define peripheral annular beading 56 and 58 which rests against the internal face of the side wall 36.

Reference is now made to FIGS. 7 and 8 which deal with a condenser having a structure very similar to the one described earlier.

In this embodiment, the reservoir 20 comprises a side wall 60 of curved shape, the generatrices of which are parallel to those of the tubular wall 36 of the manifold 16. The wall 60 has a U-shaped cross section ending in two parallel edges 62 and 64 (FIG. 8) which are attached to two diametrically opposed generatrices 66 and 68 of the side wall 36. The wall 60 thus delimits inside the manifold 16 a volume the cross section of which resembles that of a crescent and in which the tubes of the bundle emerge. This space is divided up by two transverse partitions 70 and 72 placed at the same points as the partitions 48 and 50 or as the partitions 56 and 58, so as to define the compartments C2, C4 and C5. The partitions 70 and 72 are crescent-shaped and the compartments C2, C4 and C5 also have a crescent-shaped cross section. Furthermore, the wall 60 has two openings 52 and 54 which are similar to those described earlier.

The operation of the condenser of FIGS. 7 and 8 is similar to that of FIGS. 1 and 2 or that of FIGS. 3 to 6.

Reference is now made to FIGS. 9 and 10 to describe another embodiment of the invention which is related to those described earlier.

The reservoir 20 here comprises a side wall 74 of circular tubular shape, situated coaxially inside the side wall 36 of the manifold 16. In this embodiment, the wall 74 extends over just part of the height of the manifold 16, in this example over practically half of this height.

The tubular wall 74 has an open end 76 closed by an end wall 44 similar to the one described earlier. It also has an open end 78 which emerges directly in a second part of the manifold 16, which is in direct communication with the tubes of the parts P3 and P4 of the bundle. An annular partition 80 is provided between the side wall 36 of the manifold and the side wall 74 of the reservoir, at its open end 78. Thus a compartment C2 similar to the one described earlier is delimited between the side walls 36 and 74, the end wall 44 and the annular partition 80.

The operation of the condenser of FIGS. 9 and 10 is similar to that of the embodiments described earlier.

Figure 12:
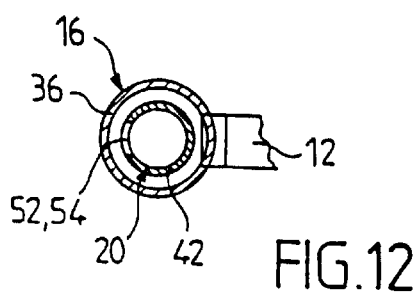
FIG. 12 is a view in section on the line XII—XII of FIG. 11.
Figure 13:
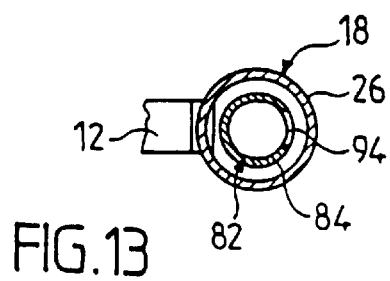
FIG. 13 is a view in section on the line XIII—XIII of FIG. 10.

In the embodiment of FIGS. 11 to 13, to which reference is now made, the manifold 16 is fitted with a reservoir 20 similar to the one described earlier with reference to FIG. 3. However, the manifold 16 and the reservoir 20 have smaller cross sections than in the earlier embodiment.

This is because the second manifold 18 also houses a second reservoir 82 which extends over the entire height of the second manifold.

The reservoir 82 comprises a tubular side wall 84 of circular section which is housed coaxially in the tubular wall 26. The wall 84 is closed by two end walls 86 and 88 which act like the end walls 28 and 30 described earlier.

Moreover, the wall 84 is bent to form two annular beads 90 and 92 forming a transverse partition and arranged at the same points as the partitions 32 and 34, as in the embodiments described earlier with reference to FIGS. 1 to 8.

The result of this is that the manifold 18 includes three compartments C1, C3 and C6 which here have an annular configuration.

The side wall 84 is provided with an opening 94 making the inside of the reservoir 80 communicate with the peripheral compartment C6 of the manifold 18, into which compartment the outlet 24 of the condenser emerges.

In the embodiment of FIGS. 11 to 13, the manifolds 16 and 18 have substantially the same diameter, as same as [sic] the reservoirs 20 and 82. The latter two make it possible to compensate for the variations in volume of the refrigerant in the liquid state.

Figure 14:
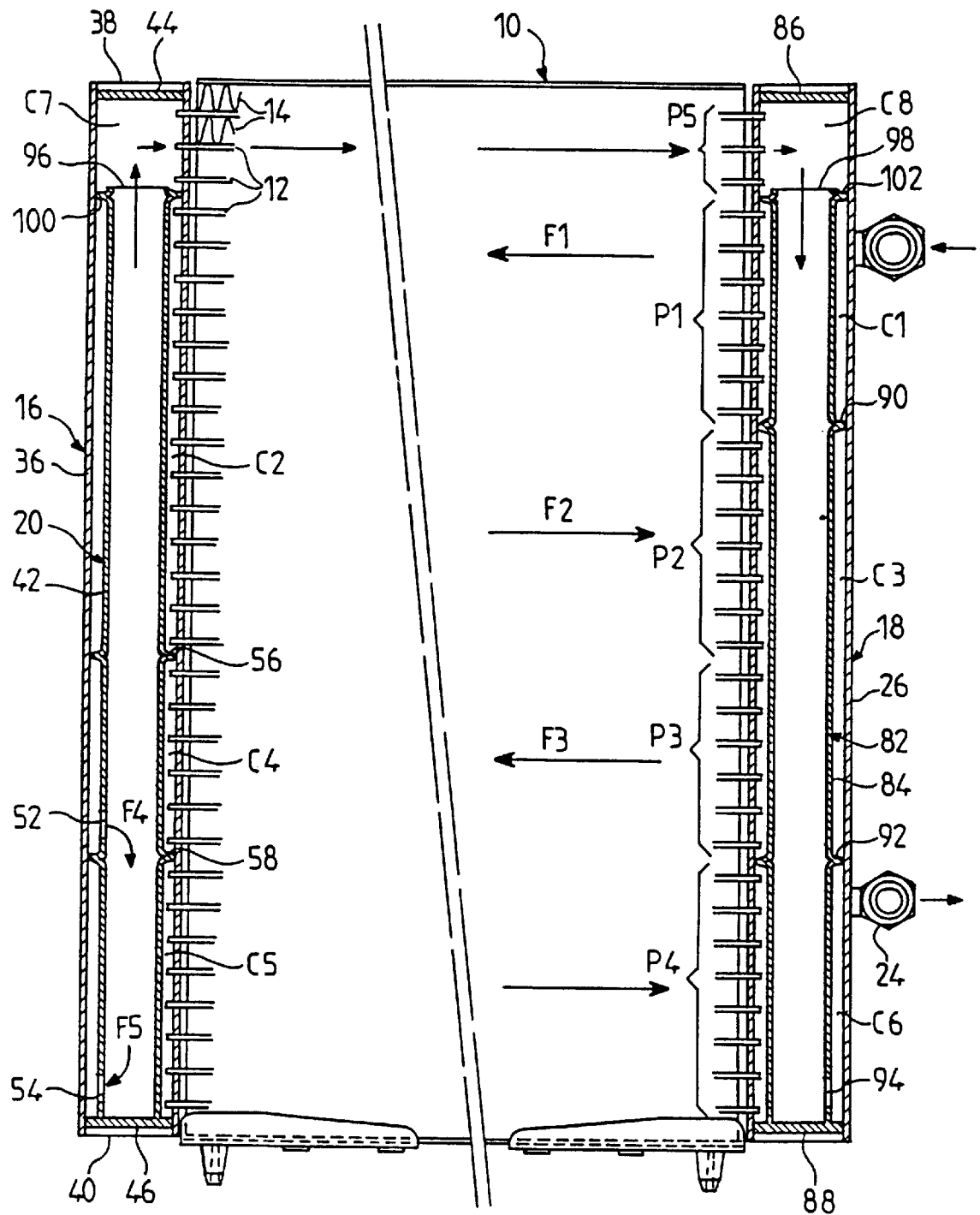
FIG. 14 is a view similar to that of FIG. 11 in an alternative form.

Reference is now made to the embodiment of FIG. 14 which is related to that of FIGS. 11 to 13.

As in the previous embodiment, the manifolds 16 and 18 respectively take two reservoirs 20 and 82.

However, these two reservoirs are shorter in height than in the previous embodiment and they have two open ends 96 and 98 respectively which are spaced away from the respective end walls 44 and 86. The open ends 96 and 98 are surrounded by two annular partitions 100 and 102 which are here obtained by deforming the walls of the reservoirs to form beading.

The open end 96 of the first reservoir 20 thus emerges in a compartment C7 which communicates via part P5 of the bundle (in the example formed of three tubes) with a compartment C8 formed in the upper part of the manifold 18 and communicating with the inside of the reservoir 82 via the open end 98. This embodiment makes it possible, at the end of the third pass (part P3; arrow F3) to separate the liquid and vapor phases in order to improve condenser performance.

The reason is that if vapor enters the reservoir 20 then this vapor tends to rise to reach the compartment C7, then the compartment C8 through the part P5 of the bundle as shown by the arrow F7. This vapor thus condenses and in the condensed state arrives at the compartment C8 in order then to reach the inside of the reservoir 82 and be discharged from the condenser via the opening 94 of the reservoir 82 and, from there, via the outlet 24.

Figure 15:
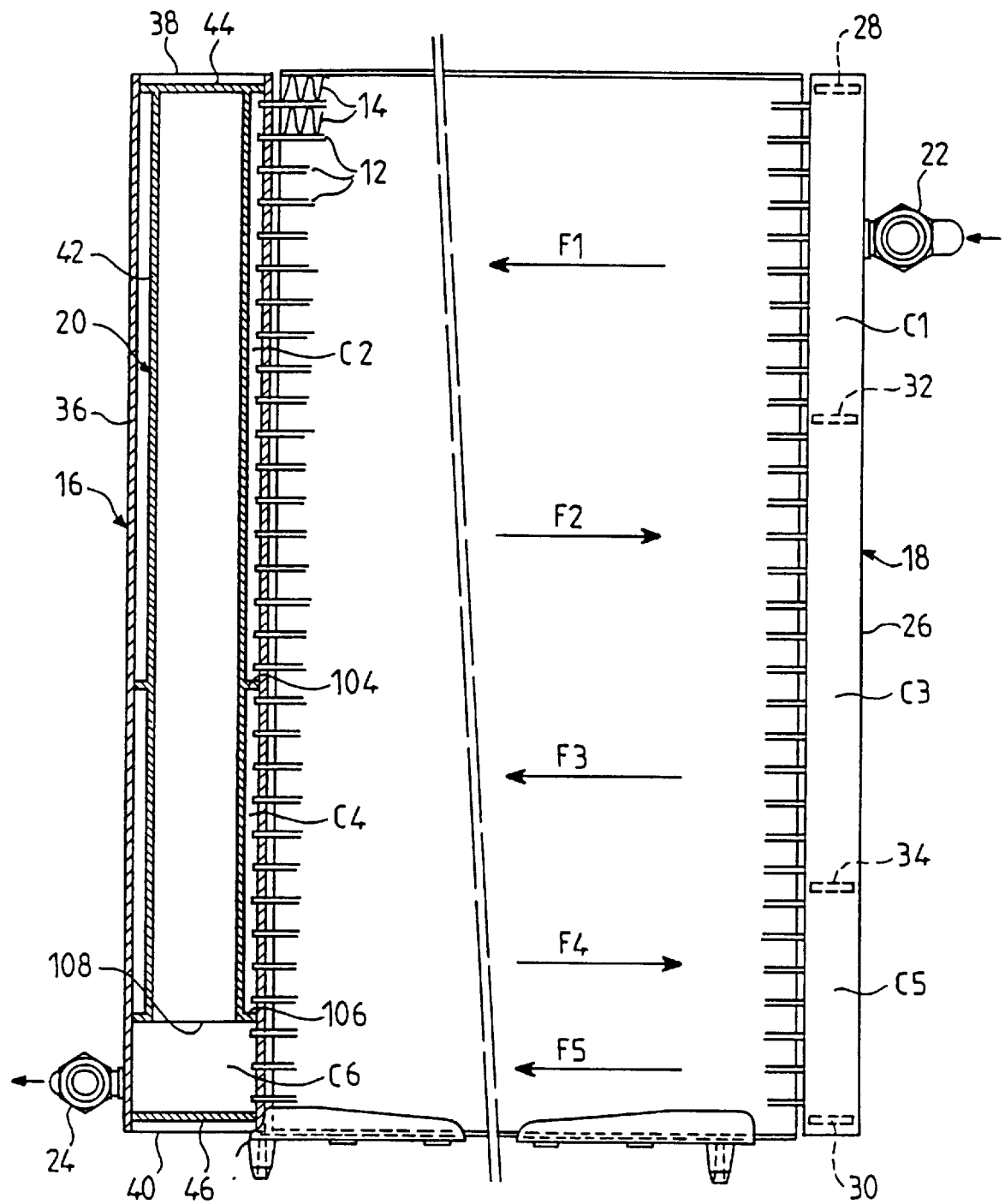
FIG. 15 is a view in elevation and in part section of a condenser according to an alternative form of FIG. 1.

The condenser represented in FIG. 15 is related to the one of FIG. 1, except that two transverse partitions 104, 106 are provided between the side wall 36 of the manifold 16 and the side wall 42 of the reservoir. However, in contrast with the embodiment of FIG. 1, no openings are provided through this side wall. Two compartments C2 and C4 are thus defined between the side wall of the reservoir and the side wall of the manifold.

As can be seen in FIG. 15, the transverse partition 106 is situated close to the end wall 46. The reservoir thus comprises an end opening 108 which makes the inside of the reservoir communicate with a compartment C6 provided at the lower part of the manifold 16.

In this embodiment, the outlet 24 of the condenser is provided on the manifold 16 and communicates directly with the compartment C6. The refrigerant enters the second manifold 18 via the inlet 22, then travels along the tubes of the bundle, as indicated by the arrows F1, F2, F3, F4 and F5 until it reaches the compartment C6 before leaving the condenser via the outlet 24 provided on the first manifold 16.

The invention is not limited to the embodiments described earlier by way of example and extends to other alternative forms, especially as far as the relative arrangement and number of tubes forming the various parts of the bundle are concerned.

The invention finds a specific application in motor vehicle air conditioning systems.

We claim:

1. A condenser for a refrigeration circuit through which a refrigerant travels, comprising a bundle of tubes which is mounted between a first manifold and a second manifold, an inlet for the refrigerant in a gaseous state, an outlet for the refrigerant in a liquid state, as well as a reservoir through which the refrigerant can pass, said reservoir being a receptacle housed in the first manifold and communicating, via at least one opening, with a downstream part of the bundle on the outlet side of the condenser, wherein the second manifold also houses a reservoir which communicates, via at least one opening, with a downstream part of the bundle on the outlet side of the condenser.

2. A condenser according to claim 1, wherein the manifold comprises a tubular side wall, wherein the reservoir comprises a side wall which is at least partially spaced away from the side wall of the manifold, and wherein transverse partitions are provided between the side wall of the manifold and the side wall of the reservoir so as to define peripheral compartments communicating with different parts of the bundle so as to allow multipass circulation of the refrigerant through the tube bundle.

3. A condenser according to claim 2, wherein the side wall of the reservoir comprises an opening for the inlet of refrigerant coming from a peripheral compartment and an outlet for removing condensed refrigerant toward another peripheral compartment, which communicates with the outlet of the condenser through a part of the bundle.

4. A condenser according to claim 2, wherein the reservoir comprises an end opening which enables the inside of the reservoir communicate with a compartment provided in the first manifold and communicating with the outlet, and wherein this outlet is provided on the first manifold.

5. A condenser according to claim 2, wherein the side wall of the reservoir is tubular and coaxial with the tubular side wall of the manifold, wherein the transverse partitions are annular, and wherein the peripheral compartments also have an annular-shaped cross section.

6. A condenser according to claim 5, wherein the transverse partitions are formed by annular elements attached between the side wall of the manifold and the side wall of the reservoir.

7. A condenser according to claim 5, wherein the transverse partitions are obtained by deformation of the side wall of the reservoir so as to define annular beading.

8. A condenser according to claim 2, wherein the side wall of the reservoir is curved and attached to two opposed generatrices of the side wall of the manifold, wherein the transverse partitions are crescent shaped and wherein the peripheral compartments also have a crescent-shaped cross section.

9. A condenser according to claim 1, wherein the first manifold comprises a tubular side wall and wherein the first reservoir comprises a tubular side wall which is coaxial with the side wall of the manifold and extends along part of the manifold emerging in another part of the manifold via an open end, an annular partition being provided between the side wall of the manifold and the side wall of the reservoir at the open end thereof.

10. A condenser according to claim 1, wherein the second manifold has no reservoir and wherein the inlet and the outlet of the condenser are provided on this second manifold.

11. A condenser according to claim 1, wherein the second manifold comprises a tubular side wall and wherein the second reservoir comprises a side wall which is at least partially spaced away from the side wall of the manifold and wherein transverse partitions are provided between the side wall of the second manifold and the side wall of the second reservoir so as to define peripheral compartments communicating with different parts of the bundle so as to allow multipass circulation of the refrigerant through the tube bundles.

12. A condenser according to claim 1, wherein the side wall of the second reservoir is tubular and coaxial with the tubular side wall of the second manifold, wherein the transverse partitions are annular and wherein the peripheral compartments are also of annular-shaped cross section.

13. A condenser according to claim 11, wherein the side wall of the second reservoir includes an opening causing the inside of the reservoir to communicate with a peripheral compartment of the second manifold, in which compartment the outlet of the condenser emerges.

14. A condenser according to claim 1, wherein the first reservoir and the second reservoir have respective open ends which emerge in two end compartments formed respectively in the first manifold and the second manifold, and wherein these two end compartments communicate with each other via some of the tubes of the bundle.

15. A condenser according to claim 3, wherein the side wall of the reservoir is tubular and coaxial with the tubular side wall of the manifold, wherein the transverse partitions are annular, and wherein the peripheral compartments also have an annular-shaped cross section.

16. A condenser according to claim 4, wherein the side wall of the reservoir is tubular and coaxial with the tubular side wall of the manifold, wherein the transverse partitions are annular, and wherein the peripheral compartments also have an annular-shaped cross section.

17. A condenser according to claim 3, wherein the side wall of the reservoir is curved and attached to two opposed generatrices of the side wall of the manifold, wherein the transverse partitions are crescent shaped and wherein the peripheral compartments also have a crescent-shaped cross section.

18. A condenser according to claim 4, wherein the side wall of the reservoir is curved and attached to two opposed generatrices of the side wall of the manifold, wherein the transverse partitions are crescent shaped and wherein the peripheral compartments also have a crescent-shaped cross section.

19. A condenser according to claim 9, wherein the second manifold has no reservoir and wherein the inlet and the outlet of the condenser are provided on this second manifold.

20. A condenser according to claim 9, wherein the second manifold also houses a reservoir which communicates, via at least one opening, with a downstream part of the bundle on the outlet side of the condenser.

21. A condenser according to claim 11, wherein the side wall of the second reservoir is tubular and coaxial with the tubular side wall of the second manifold, wherein the transverse partitions are annular and wherein the peripheral compartments are also of annular-shaped cross section.

22. A condenser according to claim 12, wherein the side wall of the second reservoir includes an opening causing the inside of the reservoir to communicate with a peripheral compartment of the second manifold, in which compartment the outlet of the condenser emerges.

23. A condenser according to claim 11, wherein the first reservoir and the second reservoir have respective open ends which emerge in two end compartments formed respectively in the first manifold and the second manifold, and wherein these two end compartments communicate with each other via some of the tubes of the bundle.

24. A condenser according to claim 12, wherein the first reservoir and the second reservoir have respective open ends which emerge in two end compartments formed respectively in the first manifold and the second manifold, and wherein these two end compartments communicate with each other via some of the tubes of the bundle.

25. A condenser according to claim 13, wherein the first reservoir and the second reservoir have respective open ends which emerge in two end compartments formed respectively in the first manifold and the second manifold, and wherein these two end compartments communicate with each other via some of the tubes of the bundle.

26. A condenser for a refrigeration circuit through which a refrigerant travels, comprising a bundle of tubes which is mounted between a first manifold and a second manifold, an inlet for the refrigerant in a gaseous state, an outlet for the refrigerant in a liquid state, as well as a reservoir through which the refrigerant can pass, said reservoir being a receptacle housed in the first manifold and communicating, via at least one opening, with a downstream part of the bundle on the outlet side of the condenser, said first manifold having a tubular side wall, said reservoir having a side wall which is at least partially spaced away from the side wall of the first manifold, and wherein transverse partitions are provided between the side wall of the first manifold and the side wall of the reservoir so as to define peripheral compartments communicating with different parts of the bundle to allow multipass circulation of the refrigerant through the tube bundle, and wherein the reservoir comprises an end opening which enables the inside of the reservoir to communicate with a compartment provided in the first manifold and communicating with the outlet, and wherein the outlet is provided on the first manifold.

27. A condenser according to claim 26, wherein the side wall of the reservoir is tubular and coaxial with the tubular side wall of the manifold, wherein the transverse partitions are annular, and wherein the peripheral compartments also have an annular-shaped cross section.

28. A condenser according to claim 26, wherein the side wall of the reservoir is curved and attached to two opposed generatrices of the side wall of the manifold, wherein the transverse partitions are crescent shaped and wherein the peripheral compartments also have a crescent-shaped cross section.

29. A condenser for a refrigeration circuit through which a refrigerant travels, comprising a bundle of tubes which is mounted between a first manifold and a second manifold, an inlet for the refrigerant in a gaseous state, an outlet for the refrigerant in a liquid state, as well as a reservoir through which the refrigerant can pass, said reservoir being a receptacle housed in the first manifold and communicating, via at least one opening, with a downstream part of the bundle on the outlet side of the condenser, said first manifold having a tubular side wall and said first reservoir having a tubular side wall which is coaxial with the side wall of the first manifold, extending along part of the first manifold and emerging in another part of the first manifold via an open end, with an annular partition being provided between the side wall of the first manifold and the side wall of the reservoir at the open end thereof, and wherein the second manifold also houses a reservoir which communicates, via at least one opening, with a downstream part of the bundle on the outlet side of the condenser.

\* \* \* \* \*